(12) United States Patent
Yamasaki

(10) Patent No.: US 8,804,706 B2
(45) Date of Patent: Aug. 12, 2014

(54) INFORMATION PROCESSING SYSTEM, RELAY DEVICE, AND COMMUNICATION CONTROL METHOD

(75) Inventor: Keisuke Yamasaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 166 days.

(21) Appl. No.: 13/308,980

(22) Filed: Dec. 1, 2011

(65) Prior Publication Data

US 2012/0207153 A1 Aug. 16, 2012

(30) Foreign Application Priority Data

Feb. 16, 2011 (JP) .................................. 2011-030334

(51) Int. Cl.
*H04L 12/50* (2006.01)

(52) U.S. Cl.
USPC .......................................... 370/357; 370/401

(58) Field of Classification Search
USPC .................................. 370/357, 401, 327, 412
See application file for complete search history.

(56) References Cited

U.S. PATENT DOCUMENTS

| | | | | |
|---|---|---|---|---|
| 5,383,177 | A | * | 1/1995 | Tateishi ........................ 370/250 |
| 5,734,328 | A | * | 3/1998 | Shinbori ........................ 340/2.7 |
| 2009/0146721 | A1 | | 6/2009 | Kurooka et al. |
| 2010/0023595 | A1 | * | 1/2010 | McMillian et al. ............ 709/212 |

FOREIGN PATENT DOCUMENTS

| | | |
|---|---|---|
| JP | 60-196037 | 10/1985 |
| JP | 2001-338541 | 12/2001 |
| JP | 2004-304255 | 10/2004 |
| JP | 2009-141722 | 6/2009 |
| JP | 2010-93543 | 4/2010 |

* cited by examiner

*Primary Examiner* — Andrew Lai
*Assistant Examiner* — Sumitra Ganguly
(74) *Attorney, Agent, or Firm* — Staas & Halsey LLP

(57) ABSTRACT

An information processing system includes information processing devices and relay devices to relay data between the information processing devices, the relay devices each including communication ports, a transmission/reception control unit to cause a first transmission/reception operation and a second transmission/reception operation to be selectively executed, the first transmission/reception operation being an operation in which data is transmitted and received at a first transmission speed, the second transmission/reception operation being an operation in which data is transmitted and received in parallel at a second transmission speed lower than the first transmission speed, and a data division unit to generate pieces of division transmission data whose number is equal to the number of the communication ports by dividing transmission data to cause the generated pieces of division transmission data to be transmitted through the respective communication ports, when the second transmission/reception operation is selected.

17 Claims, 13 Drawing Sheets

FIG. 12

| RACK No. | DE No. | DE IDENTIFICATION INFORMATION | STORAGE INFORMATION |
|---|---|---|---|
| RACK #1 | DE #1 | 00:01:1b:11 | SAS HDD, 6GT/s, ··· |
| | | | SAS HDD, 6GT/s, ··· |
| | | | ⋮ |
| | DE #2 | ⋮ | ⋮ |
| | DE #3 | ⋮ | ⋮ |
| RACK #2 | DE #1 | ⋮ | ⋮ |
| | ⋮ | ⋮ | ⋮ |
| | DE #4 | ⋮ | ⋮ |

221

INFORMATION PROCESSING SYSTEM, RELAY DEVICE, AND COMMUNICATION CONTROL METHOD

CROSS-REFERENCE TO RELATED APPLICATIONS

This application is based upon and claims the benefit of priority of the prior Japanese Patent Application No. 2011-030334, filed on Feb. 16, 2011, the entire contents of which are incorporated herein by reference.

FIELD

The embodiments discussed herein are related to an information processing system, a relay device, and a communication control method.

BACKGROUND

In recent years, there have been widely prevailed storage systems each of which uses a plurality of large-capacity storage devices such as hard disk drives (HDDs) or the like. Usually, the storage system includes a plurality of storage devices and a control device controlling access to these storage devices. Individual devices in such a storage system are connected to one another through switches, for example. Connection is established between a switch and a switch or between a switch and another device, using a transmission path such as a communication cable, a printed-circuit board, or the like. In the case of the storage system, in many cases, a transmission path compliant with a standard such as Fibre Channel (FC), Serial Attached SCSI (SAS, SCSI: Small Computer System Interface), or the like is used.

For example, a control device or a storage device within the storage system is realized as a rack-mountable module device. For example, in some case, a switch for connecting devices to each other is realized as a single module device, and, in other cases, the switch is provided within a module device such as a control device, a storage device, or the like. In addition, in a storage system where the number of storage devices is large, storage devices and switches are contained in a plurality of racks, and racks are connected to one another using the above-mentioned transmission path, in some cases.

In addition, as an example of a system in which data is transmitted through a plurality of transmission paths, there is a system that includes a transmission-path multiplexing device transmitting data to the plural transmission paths through a bus subjected to time-division multiplexing and prevents a time-division channel number corresponding to a transmission path from being generated when abnormity occurs in the transmission path. An example of such a system is disclosed in Japanese Laid-open Patent Publication No. 60-196037.

In addition, as an example of a technique achieving the appropriate characteristic of a transmission path, there is an imaging device in which the transmission timing of an image synchronization signal is controlled on the basis of the detection result of a cable length. An example of such a technique is disclosed in Japanese Laid-open Patent Publication No. 2010-93543. Furthermore, there is also a skew adjustment method in which, on the basis of a measurement value of the signal propagation time of a pair of cables, an acceptable cable length is calculated and a cable length is adjusted, thereby reducing the skew of a cable. An example of such a technique is disclosed in Japanese Laid-open Patent Publication No. 2001-338541.

Incidentally, in a case in which high-speed serial transmission ranging from several hundred Mbps to several Gbps is performed in a transmission path, when a signal has passed through the transmission path, an insertion loss occurs in some cases. For example, this insertion loss occurs as a resistive loss due to a skin effect, a dielectric loss due to the dielectric tangent (tan δ) of substrate material, or the like. The insertion loss increases with an increase in a transmission frequency or with an increase in the transmission distance of a signal.

In the above-mentioned storage system, when a plurality of devices exist in the storage system, for example, when storage devices are contained in a plurality of racks, the length of a transmission path between switches becomes large, in some cases. When the length of the transmission path becomes large, there occurs a problem that the insertion loss increases and it is difficult to correctly transmit data. In particular, in the storage system, a data transmission speed between devices is requested to be enhanced, and when the data transmission speed is enhanced, the insertion loss further increases.

SUMMARY

According to an aspect of the invention, an information processing system includes information processing devices and relay devices each configured to relay data transmitted and received between the information processing devices. The relay devices each includes communication ports configured to communicate data between the relay devices, a transmission/reception control unit configured to cause a first transmission/reception operation and a second transmission/reception operation to be selectively executed, the first transmission/reception operation being an operation in which data is caused to be transmitted and received at a first transmission speed in each of the communication ports, the second transmission/reception operation being an operation in which data is caused to be transmitted and received in parallel at a second transmission speed, in each of the communication ports, lower than the first transmission speed, and a data division unit configured to generate pieces of division transmission data whose number is equal to the number of the communication ports by dividing transmission data to cause the generated pieces of division transmission data to be transmitted in parallel through the respective communication ports, when the transmission/reception control unit selects the second transmission/reception operation.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 12 is a diagram illustrating an example of information registered in a connection management table.

DESCRIPTION OF EMBODIMENTS

Hereinafter, embodiments are described in detail with reference to drawings.

First Embodiment

Figure 1:
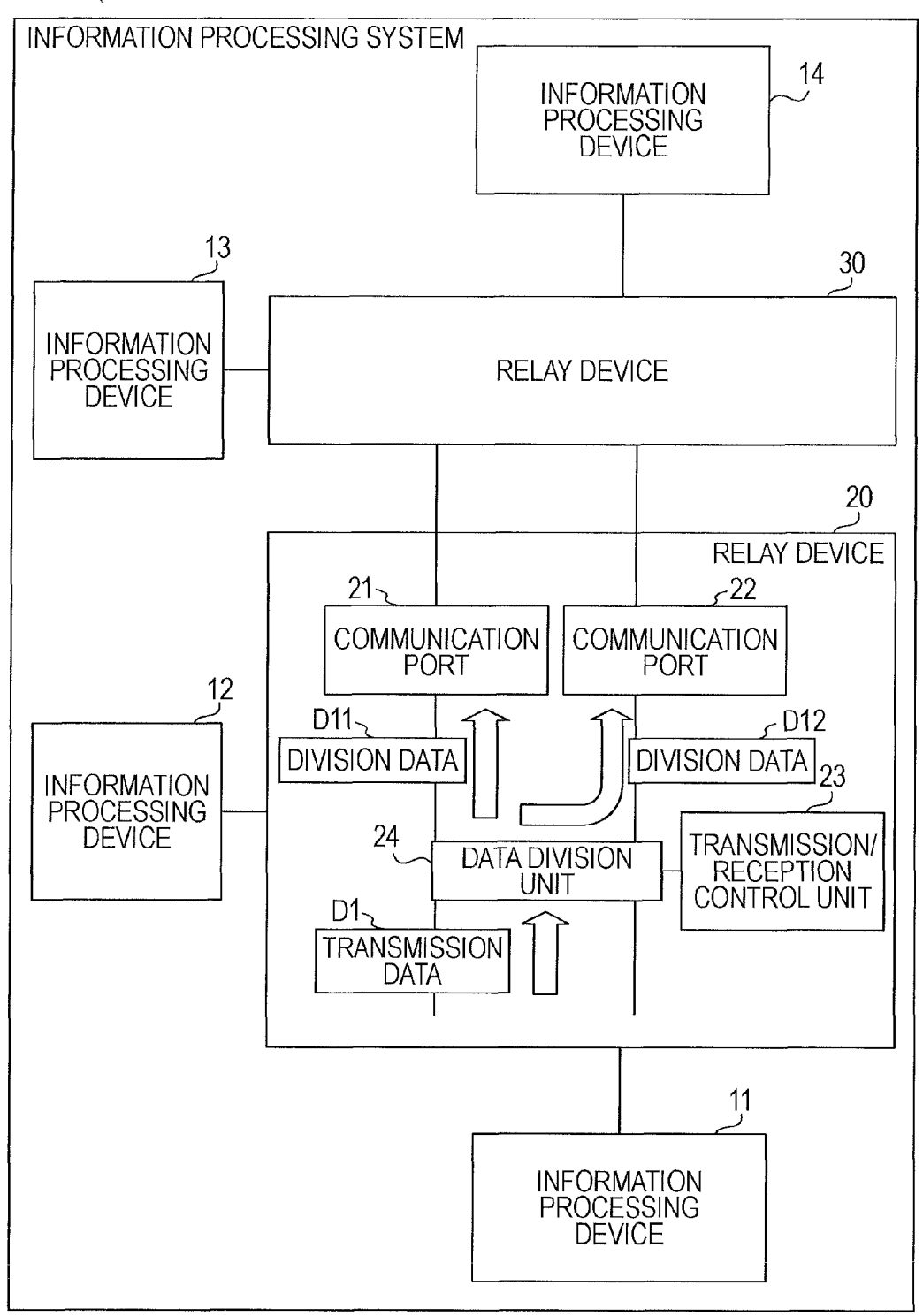
FIG. 1 is a diagram illustrating an example of a configuration of an information processing system according to a first embodiment.

FIG. 1 is a diagram illustrating an example of the configuration of an information processing system according to a first embodiment.

An information processing system 1 illustrated in FIG. 1 includes information processing devices 11 to 14 and relay devices 20 and 30 relaying data transmitted and received between these information processing devices 11 to 14. In this FIG. 1, the relay device 20 is connected to the information processing devices 11 and 12 and the relay device 30, and relays pieces of data individually transmitted and received between the information processing device 11 and the information processing device 12, between the information processing device 11 and the information processing device 13, and between the information processing device 11 and the information processing device 14, for example. In addition, the relay device 30 is connected to the information processing devices 13 and 14 and the relay device 20, and relays pieces of data individually transmitted and received between the information processing device 11 and the information processing device 13 and between the information processing device 11 and the information processing device 14, for example.

In addition, while, in the example in FIG. 1, the four information processing devices 11 to 14 are provided, the number of information processing devices provided in the information processing system 1 is not specifically limited if being greater than or equal to two. In addition, the number of the relay devices and a connection state with respect to the information processing devices are also not limited to the example in FIG. 1. For example, a plurality of information processing devices may be connected to one relay device.

The relay device 20 includes communication ports 21 and 22, a transmission/reception control unit 23, and a data division unit 24. In addition, since the relay device 30 has the same configuration as the relay device 20, the description thereof is omitted here.

For example, both the communication ports 21 and 22 are connected to the relay device 30. In a first operation mode that is a normal operation mode, the communication port 21 transmits and receives data to and from the relay device 30 at a first transmission speed. In addition, in the same way, in the first operation mode, the communication port 22 also transmits and receives data to and from the relay device 30 at the first transmission speed. In addition, in the first operation mode, data transmission/reception through the communication port 22 may not be performed.

On the other hand, each of the communication ports 21 and 22 can also perform communication in a second operation mode in which data is transmitted and received at a second transmission speed lower than the first transmission speed. In the second operation mode, the communication ports 21 and 22 are combined and data is transmitted and received in parallel.

The transmission/reception control unit 23 sets an operation mode in the communication ports 21 and 22. For example, the transmission/reception control unit 23 selects one of the first and second operation modes in accordance with the lengths of transmission paths between the communication ports 21 and 22 and the relay device 30.

When the transmission/reception control unit 23 selects the second operation mode, the data division unit 24 divides transmission data D1 to be transmitted to the relay device 30, in accordance with the number of the communication ports 21 and 22, and generates pieces of division data D11 and D12. The data division unit 24 outputs one piece of generated division data D11 to the communication port 21, and outputs the other piece of generated division data D12 to the communication port 22.

Accordingly, the pieces of division data D11 and D12 are individually transmitted in parallel from the communication ports 21 and 22 to the relay device 30. At this time, while the transmission speed of each of the pieces of division data D11 and D12 is lowered compared with the first operation mode, the reduction of the transmission speeds of the pieces of division data D11 and D12 is suppressed as a whole. For example, if the second transmission speed is half the first transmission speed, in the second operation mode, the transmission processing of the transmission data D1 is completed in about the same time as in a case in which the transmission data D1 is transmitted through one communication port (for example, the communication port 21) in the first operation mode.

Figure 2:
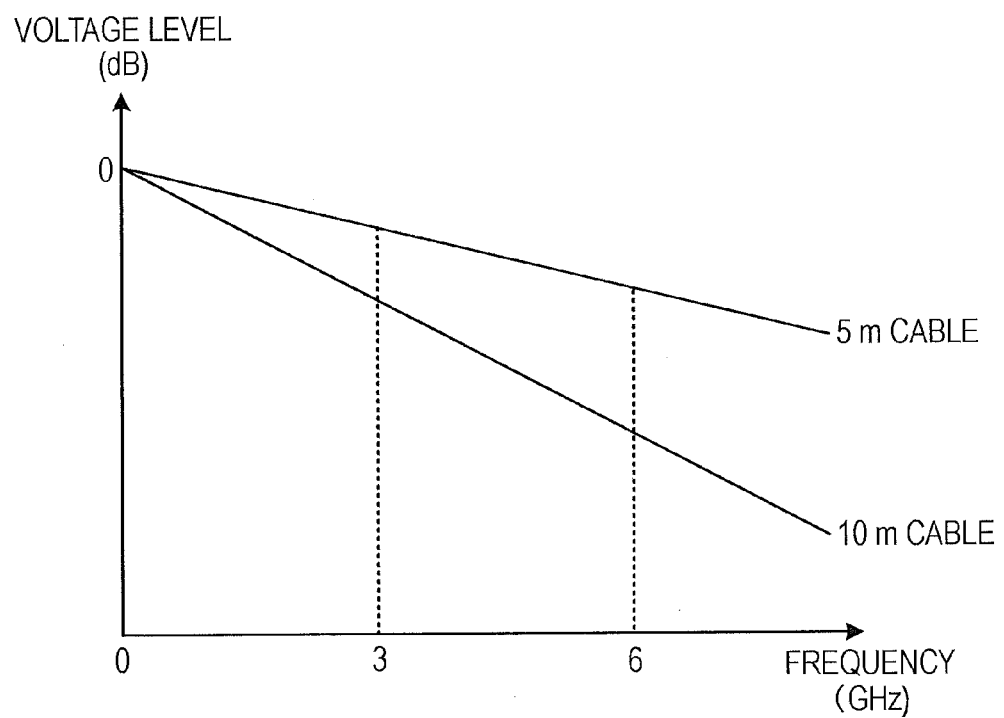
FIG. 2 is an example of a graph illustrating an insertion loss characteristic in a transmission path.

Here, FIG. 2 is an example of a graph illustrating an insertion loss characteristic in a transmission path.

When a signal is transmitted through the transmission path, an insertion loss may occur. When the insertion loss is large, a voltage level at the high level of transmission data is greatly attenuated during a process in which the transmission data goes through the transmission path. Therefore, the voltage level at the high level turns out not to satisfy the threshold level of bit decision on a receiving side. In this case, it is difficult to correctly receive data.

The insertion loss has a frequency characteristic, and as illustrated in FIG. 2, the insertion loss increases with an increase in a transmission frequency. In particular, when high-speed transmission is performed in which a transmission frequency per one transmission path ranges from several hundred Mbps to several Gbps, the influence of the insertion loss becomes too large to ignore.

Furthermore, as illustrated in FIG. 2, the insertion loss increases with an increase in the length of a transmission path (for example, a cable). Since, in high-speed serial transmission such as 6 Gbps (a basic clock frequency: 3 GHz) of recent years, the insertion loss increases, there has occurred a problem that it is hard to lengthen a transmission path. On the other hand, there has occurred a problem that it is necessary for the length of a transmission path between devices to be lengthened with an increase in the size of the information processing system.

With respect to such problems, in the information processing system 1 illustrated in FIG. 1, when the transmission path between the relay devices 20 and 30 is so long that the influence of the insertion loss becomes large, it is possible to certainly transmit data by performing transmission in the second operation mode.

In particular, even in the first operation mode in which communication is performed at the first transmission speed in both the communication ports 21 and 22, high-speed communication whose transmission speed is close to the first transmission speed is not constantly performed in both the communication ports 21 and 22, in many cases. Therefore, by performing communication in the above-mentioned second operation mode, it is possible to correctly transmit data without a communication speed being greatly lowered.

Furthermore, in an information processing system of recent years, there are many devices each of which includes many communication ports, and in such a device, there are many communication ports not usually used. When the communication port not usually used in such a way is applied as the communication port 22 in FIG. 1, it is possible to correctly transmit data with a communication speed being hardly lowered.

In addition, for example, the transmission/reception control unit 23 can select an operation mode by recognizing, in some method, the length of a transmission path with respect to the relay device 30 connected through the communication ports 21 and 22. For example, on the basis of the position information of the relay device 20 in the information processing system 1, the transmission/reception control unit 23 determines which operation mode is to be set. Alternatively, for example, when a storage device storing therein the information of the length of a communication cable is provided in the connector of the communication cable between the relay devices 20 and 30, the transmission/reception control unit 23 may also select an operation mode on the basis of the cable length information read out from the storage device.

Next, as an example of the information processing system, an embodiment is described to which a storage system is applied.

Second Embodiment

Figure 3:
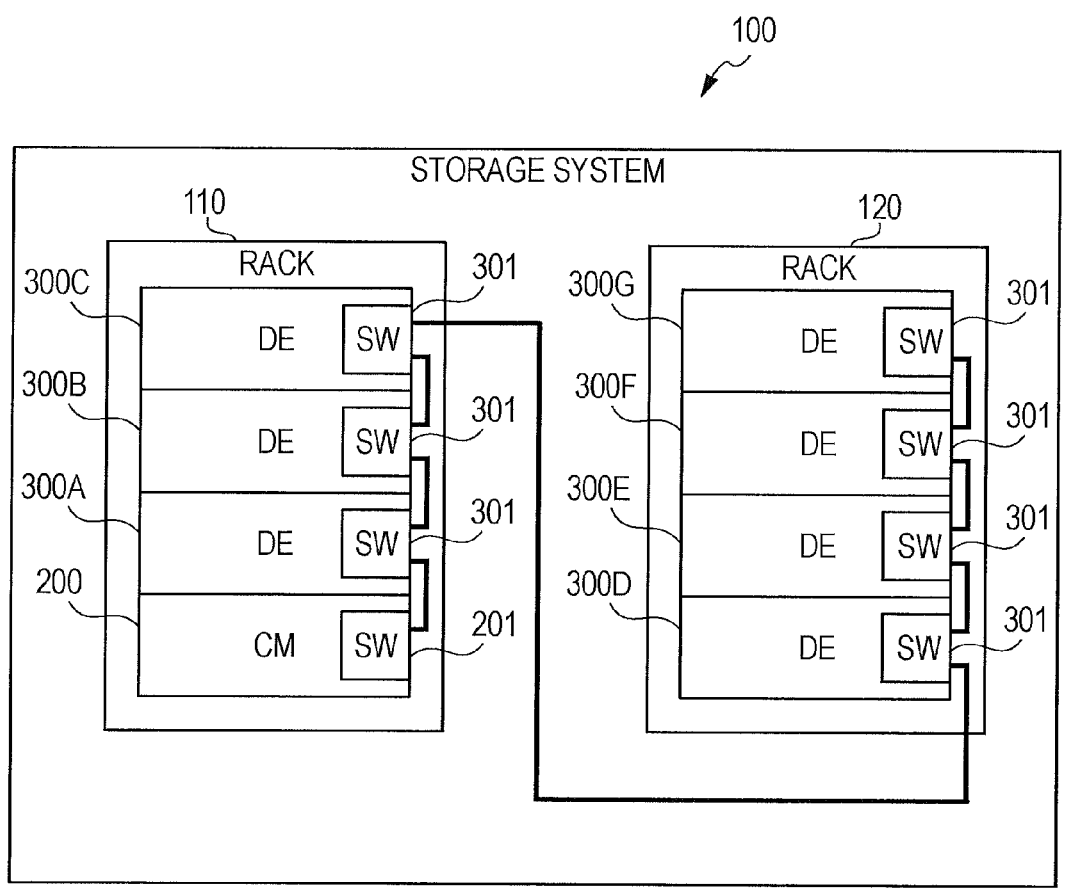
FIG. 3 is a diagram illustrating an example of a whole configuration of a storage system according to a second embodiment.

FIG. 3 is a diagram illustrating an example of the whole configuration of a storage system according to a second embodiment.

A storage system 100 illustrated in FIG. 3 includes a controller module (CM) 200 and a plurality of drive enclosures (DEs) 300A to 300G. This storage system 100 is a system including a plurality of HDDs as storage devices, and one or more HDDs configuring the storage device are stored in each of the DEs 300A to 300G. In addition, the storage devices are not limited to HDDs, and another type of storage device, such as a solid state drive (SSD) for example, may be used.

The CM 200 controls access to the HDD included in each of the DEs 300A to 300G, in response to a write request or a readout request for data from a host device not illustrated. In the present embodiment, as an example, the CM 200 controls the storage areas of the HDDs individually included in the DEs 300A to 300G, on the basis of Redundant Arrays of Inexpensive Disks (RAID).

Each of the CM 200 and the DEs 300A to 300G is realized a rack-mountable module. In addition, in the example in FIG. 3, the CM 200 and the DEs 300A to 300C are contained in the rack 110, and the DEs 300D to 300G are contained in the rack 120.

As an example, the CM 200 and the DEs 300A to 300G are connected to one another by a communication cable or a printed-circuit board, compliant with an SAS standard. In addition, in the example in FIG. 3, the CM 200 includes a switch (SW: corresponding to a relay device in claims) 201, and each of the DEs 300A to 300G includes a switch (SW) 301. The switches 201 and 301 are devices for switching transmission paths. In addition, the switches individually included in the CM 200 and the DEs 300A to 300G are cascade-connected, thereby connecting the CM 200 to the HDDs within the DEs 300A to 300G.

For example, the switch 301 in the DE 300A is connected to the switch 201 in the adjacent CM 200 and the switch 301 in the adjacent DE 300B, and the switch 301 in the DE 300B is connected to the switch 301 in the adjacent DE 300A and the switch 301 in the adjacent DE 300C. In addition, the switch 301 in the DE 300C and the switch 301 in the DE 300D are connected to each other through a communication cable running outside of the racks 110 and 120, thereby connecting the modules within the rack 110 to the modules within the rack 120.

Figure 4:
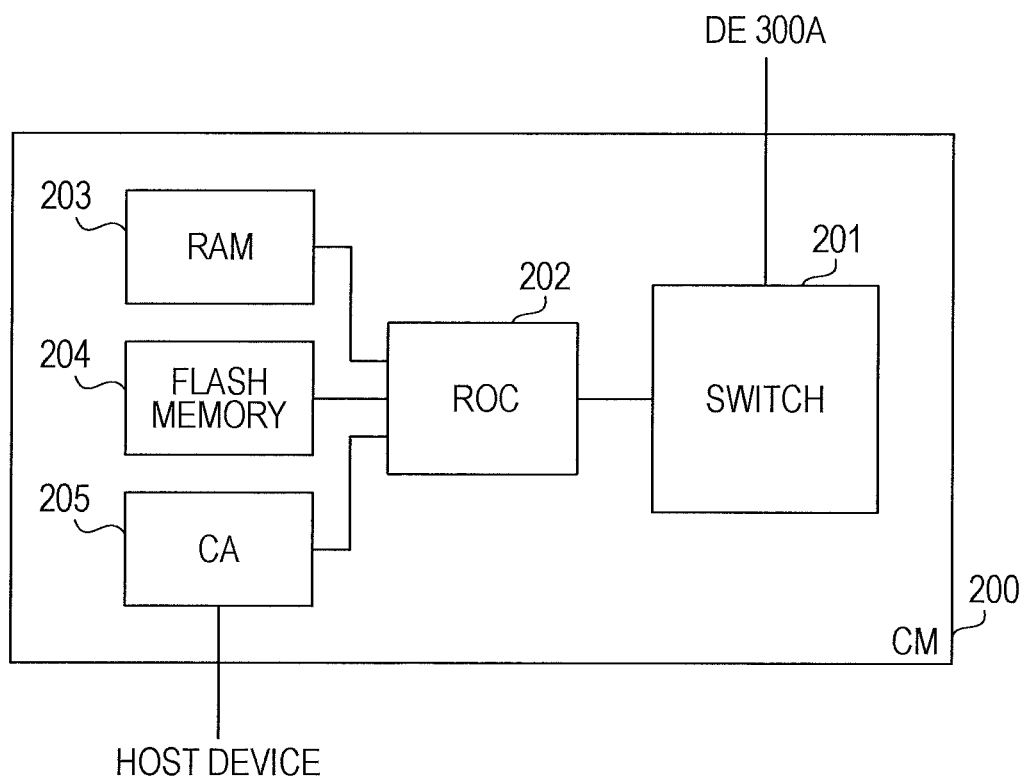
FIG. 4 is a diagram illustrating an example of a configuration of hardware of CM.

FIG. 4 is a diagram illustrating an example of the configuration of the hardware of the CM. In addition to the above-mentioned switch 201, the CM 200 includes a RAID on Chip (ROC) 202, a Random Access Memory (RAM) 203, a flash memory 204, and a Channel Adapter (CA) 205 connected to a host device.

The ROC 202 incorporates therein a Central Processing Unit (CPU) 202 controlling the whole CM 200 in an integrated manner and an SAS controller interfacing with the switch 201.

The RAM 203 is used as the main storage device of the CM 200, and temporarily stores therein part of firmware caused to be executed by the CPU within the ROC 202 and various kinds of data for processing performed by the firmware.

The flash memory 204 is used as the secondary storage device of the CM 200, and stores therein firmware to be executed by the CPU within the ROC 202 and various kinds of data for executing the firmware. In addition, as the secondary storage device, for example, another type of nonvolatile storage device such as an HDD or the like may also be used.

The CA 205 is connected to a host device not illustrated, and executes interface processing for transmitting and receiving data to and from the host device. The CPU within the ROC 202 controls access to the HDDs within the DEs 300A to 300G, in response to a write request or a readout request for data, accepted from the host device by the CA 205.

The switch 201 relays data between the ROC 202 and the switch provided in another module such as the DE 300A or the like.

Figure 5:
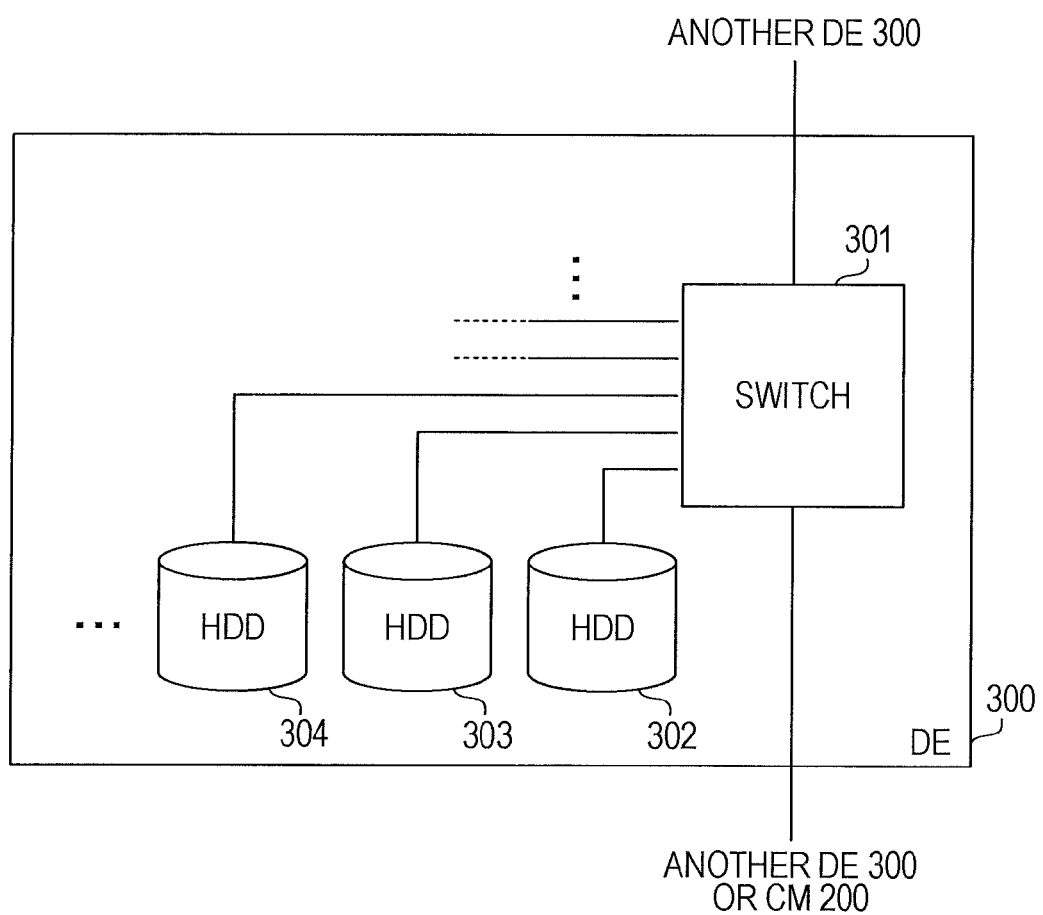
FIG. 5 is a diagram illustrating an example of a configuration of hardware of DE.

FIG. 5 is a diagram illustrating an example of the configuration of the hardware of the DE. In addition, since each of the DEs 300A to 300G has the same hardware configuration, each of these is expressed "DE 300". The DE 300 includes a plurality of HDDs 302, 303, 304, . . . in addition to the above-mentioned switch 301.

Each of the HDDs 302, 303, 304, . . . is connected to the switch 301, and accepts access from the CM 200 through the switch 301. Each of the HDDs 302, 303, 304, . . . includes an SAS controller not illustrated, and the SAS switch controls the transmission and reception of data to and from the switch 301.

Figure 6:
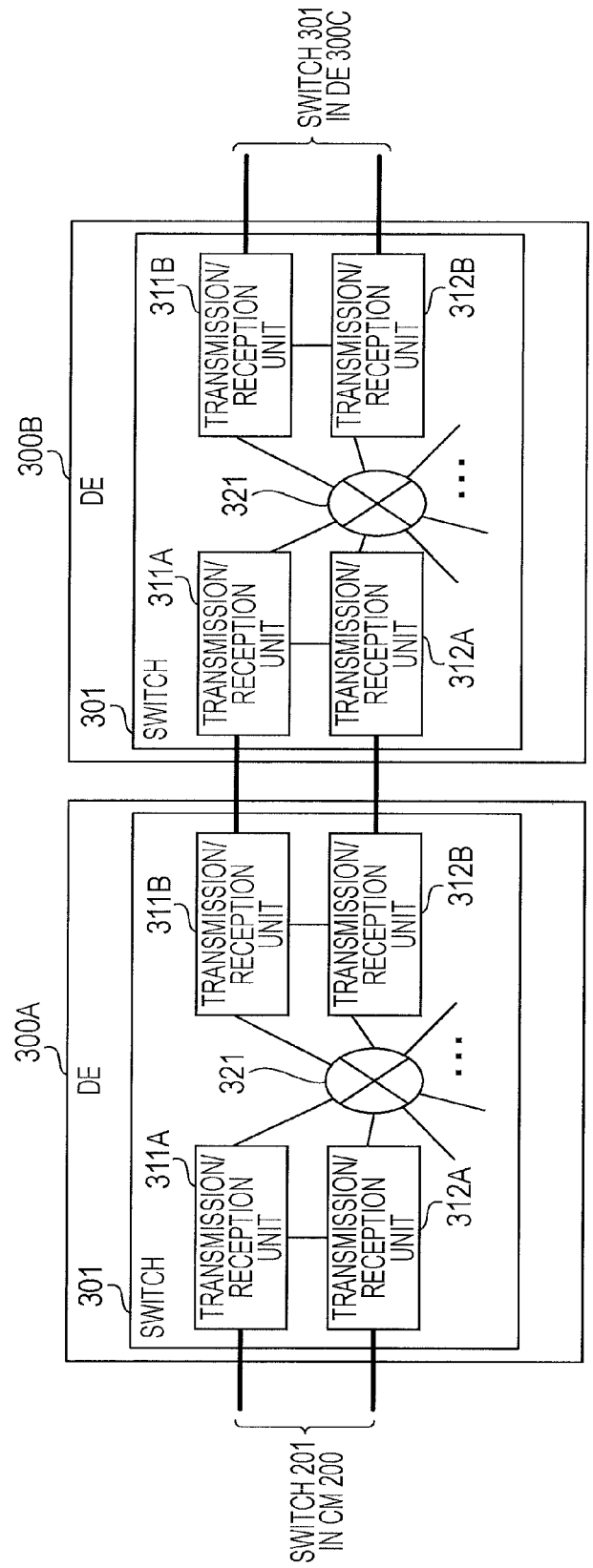
FIG. 6 is a diagram illustrating a schematic configuration of a switch and a connection relationship between switches.

FIG. 6 is a diagram illustrating the schematic configuration of the switch and a connection relationship between the switches.

The switch 301 provided in each of the DEs 300A to 300G includes a plurality of transmission/reception units and a crossbar 321 relaying data between the individual transmission/reception units. Each of the transmission/reception units includes a pair of a transmission circuit (Tx) and a reception circuit (Rx).

The Tx transmits data to another SAS device such as a switch or the like using a differential signal line, and the Rx receives data from the other SAS device using a differential signal line, thereby performing full-duplex communication on the basis of the pair of differential signal lines. In addition, the pair of differential signal lines included in the Tx and Rx within one transmission/reception unit configures one physical port. Hereinafter, this physical port is referred to as a "narrow port". It is assumed that one narrow port can transmit and receive data at up to 6 Gbps. In addition, a bundle of a pair of differential signals transmitted and received by the Tx and Rx within the transmission/reception unit is referred to as a "narrow link".

In addition, in the SAS standard, it is possible to configure one logical port by combining a plurality of narrow ports, and such as port is referred to as a "wide port". In the present embodiment, it is assumed that it is possible to configure the wide port by combining two narrow ports. In this case, one wide port can transmit and receive data at up to 12 Gbps. In addition, a bundle of pairs of differential signals transmitted and received by the wide port is referred to as a "wide link".

The switch 301 provided in each of the DEs 300A to 300G includes at least transmission/reception units 311A, 311B, 312A, and 312B as the above-mentioned transmission/reception units. From among these transmission/reception units, the transmission/reception units 311A and 312A are connected to another DE or the switch included in the CM 200, thereby allowing the wide port to be configured. In addition, in the same way, the transmission/reception units 311B and 312B are also connected to another DE or the switch included in the CM 200, thereby allowing the wide port to be configured.

Here, in the present embodiment, each of the transmission/reception units 311A, 311B, 312A, and 312B can selectively operate in one of a "normal mode", a "slow mode", and a "parallel mode". Each of the normal mode and the slow mode is an operation mode in which switches perform communication as wide ports. In the normal mode, each of the transmission/reception units 311A, 311B, 312A, and 312B communicates with the transmission/reception unit in the other-side switch at 6 Gbps. In this case, the switches perform communication through the wide port at the speed of 12 Gbps. On the other hand, in the slow mode, each of the transmission/reception units 311A, 311B, 312A, and 312B communicates with the transmission/reception unit in the other-side switch at 3 Gbps. In this case, the switches perform communication through the wide port at the speed of 6 Gbps.

In addition, in the parallel mode, each of two transmission/reception units capable of configuring the wide port performs communication at half the speed (namely, 3 Gbps). At this time, using two transmission/reception units, data is transmitted and received in parallel, thereby performing communication whose speed is 6 Gbps in sum total. In the parallel mode, in such a way, in each narrow port, communication is performed at half the speed. Accordingly, even if the distance of a transmission path between narrow ports is large and it is difficult to ignore the influence of the insertion loss at the time of the communication of 6 Gbps, it is possible to correctly perform communication.

In FIG. 6, as an example, the switch 301 included in each of the DEs 300A and 300B from among the DEs 300A to 300G is illustrated. In FIG. 6, for example, communication is performed between the DE 300A and the DE 300B as follows. In the normal mode, the transmission/reception units 311B and 312B in the DE 300A and the transmission/reception units 311A and 312A in the DE 300B perform communication as wide ports. On the other hand, in the parallel mode, the transmission/reception units 311B and 312B in the DE 300A and the transmission/reception units 311A and 312A in the DE 300B perform communication in parallel at half the speed.

In the parallel mode, for example, when data is transmitted from the DE 300A to the DE 300B, while data from the crossbar 321 in the DE 300A is supplied to the transmission/reception unit 311B, the data is not supplied to the transmission/reception unit 312B. The transmission/reception unit 311B having received the supply of data divides the data into two pieces of data, and supplies one piece of data to the transmission/reception unit 312B. Accordingly, the transmission/reception units 311B and 312B transmit the divided data in parallel to the switch 301 in the DE 300B. While receiving one piece of division data transmitted from the transmission/reception unit 311B in the DE 300A, the transmission/reception unit 311A in the DE 300B acquires the other piece of division data transmitted from the transmission/reception unit 312B in the DE 300A, through the transmission/reception unit 312A. In addition, the transmission/reception unit 311A in the DE 300B restores original data from both pieces of division data, and supplies the original data to the crossbar 321.

In addition, for example, when data is transmitted from the DE 300B to the DE 300A in the parallel mode, while data from the crossbar 321 in the DE 300B is supplied to the transmission/reception unit 311A, the data is not supplied to the transmission/reception unit 312A. The transmission/reception unit 311A having received the supply of data divides data into two pieces of data, and supplies one piece of data to the transmission/reception unit 312A. Accordingly, the transmission/reception units 311A and 312A transmit the divided data in parallel to the switch 301 in the DE 300A. While receiving one piece of division data transmitted from the transmission/reception unit 311A in the DE 300B, the transmission/reception unit 311B in the DE 300A acquires the other piece of division data transmitted from the transmission/reception unit 312A in the DE 300B, through the transmission/reception unit 312B. In addition, the transmission/reception unit 311B in the DE 300A restores original data from both pieces of division data, and supplies the original data to the crossbar 321.

In the same way, also between other DEs, in the normal mode and the slow mode, the transmission/reception units 311B and 312B in one DE and the transmission/reception units 311A and 312A in the other DE perform communication as wide ports. On the other hand, in the parallel mode, the transmission/reception units 311B and 312B in one DE and the transmission/reception units 311A and 312A in the other DE perform communication in parallel at half the speed.

Figure 7:
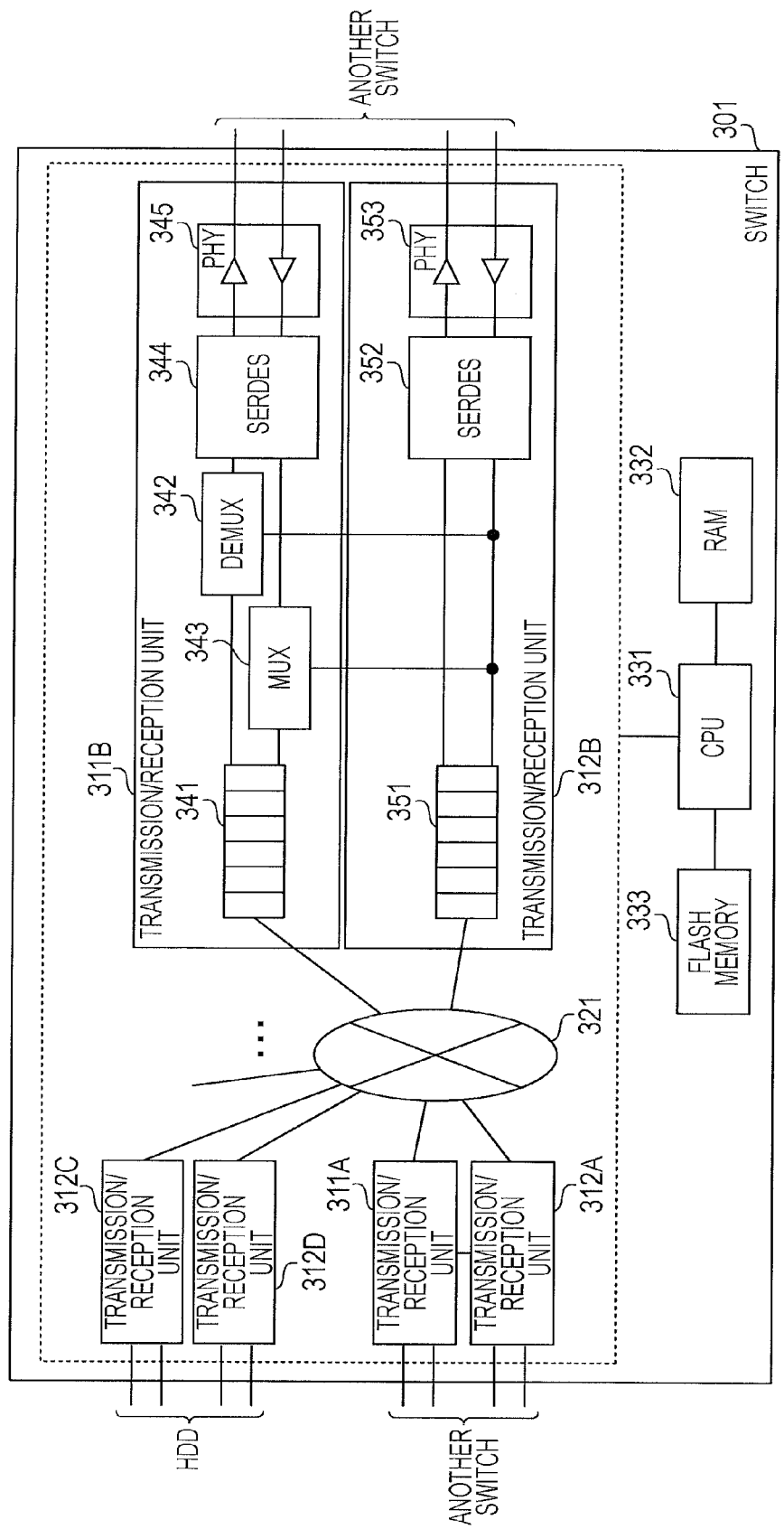
FIG. 7 is a diagram illustrating an example of an inner structure of a switch included in DE.

FIG. 7 is a diagram illustrating an example of the inner structure of a switch included in the DE.

As illustrated in FIG. 7, the switch 301 included in each of the DEs 300A to 300G includes transmission/reception units 312C and 312D, a CPU 331, a RAM 332, and a flash memory 333 in addition to the above-mentioned transmission/reception units 311A, 311B, 312A, and 312B and the crossbar 321.

Under control of the CPU 331, the crossbar 321 outputs a frame input from a transmission/reception unit connected to the crossbar 321 to another transmission/reception unit corresponding to the destination of the frame.

The transmission/reception units 312C and 312D transmit and receive data between the crossbar 321 and an HDD (for example, the HDD 302) in the same DE, as the wide port. The transmission/reception units 312C and 312D include the same configurations as those of the transmission/reception units 312A and 312B. In this regard, however, the transmission/reception units 312C and 312D may also include communication functions in the parallel mode, as the transmission/reception units 311B and 312B. For example, when the switch and the HDD are provided in separate chassis, a plurality of transmission/reception units including transmission/reception functions in the parallel mode are provided in both the switch and the HDD, in the same way as the transmission/reception units 311B and 312B. In this case, when the distance of a transmission path between the switch and the HDD is large, the switch and the HDD perform communication in the parallel mode, and hence it is possible to execute correct communication without being subjected to the influence of the insertion loss.

In addition, in addition to this, another transmission/reception unit may also be connected to the crossbar 321.

The CPU 331 controls the operation of the switch 301 in an integrated manner. By executing firmware stored in the flash memory 333, the CPU 331 executes data relay processing performed in the crossbar 321, processing operations for switching operation modes in the transmission/reception units 311A, 311B, 312A, and 312B, and the like.

The RAM 332 temporarily stores therein at least part of firmware caused to be executed by the CPU 331 and various kinds of data for processing performed by the firmware. The flash memory 333 stores therein firmware to be executed by the CPU 331, various kinds of data for executing the firmware, and the like.

Since both the transmission/reception units 311A and 311B have the same configuration, the transmission/reception unit 311B is described on behalf of both the transmission/reception units 311A and 311B, here. In addition, since both the transmission/reception units 312A and 312B also have the same configuration, the transmission/reception unit 312B is described on behalf of both the transmission/reception units 312A and 312B, here. The transmission/reception unit 311B includes a frame buffer 341, a Demultiplexer (DEMUX) 342, a Multiplexer (MUX) 343, a Serializer/Desirializer (SERDES) 344, and a physical layer processing circuit (PHY) 345. In addition, the transmission/reception unit 312B includes a frame buffer 351, a SERDES 352, and a PHY 353.

First, in the transmission/reception unit 312B, the frame buffer 351 temporarily stores therein a frame output, as parallel data, from the crossbar 321 to the transmission/reception unit 312B, and outputs the stored frame to the SERDES 352. In addition, the frame buffer 351 receives a frame, transmitted from another switch to the transmission/reception unit 312B, from the SERDES 352, temporarily stores therein the frame, and outputs the stored frame to the crossbar 321.

The SERDES 352 converts the frame input as the parallel data into serial data and outputs the serial data to the PHY 353. While the SERDES 352 receives the frame from the frame buffer 351 in the normal mode, the SERDES 352 receives a frame from the DEMUX 342 in the transmission/reception unit 311B in the parallel mode. In addition, the SERDES 352 converts the frame, received as serial data from another switch through the PHY 353, into parallel data. While the SERDES 352 outputs a parallelized frame to the frame buffer 351 in the normal mode, the SERDES 352 outputs a parallelized frame to the MUX 343 in the transmission/reception unit 311B in the parallel mode.

The PHY 353 includes Tx, and transmits, as a differential signal, a frame serialized by the SERDES 352 to another switch. In addition, the PHY 353 includes Rx, and receives, as a differential signal, a frame from another switch and transmits the frame to the SERDES 352.

On the other hand, in the transmission/reception unit 311B, the frame buffer 341 temporarily stores therein a frame output, as parallel data, from the crossbar 321 to the transmission/reception unit 311B, and outputs the stored frame to the DEMUX 342. In addition, the frame buffer 341 receives a frame output, as parallel data, from the MUX 343, and outputs the stored frame to the crossbar 321.

The DEMUX 342 transfers a frame, output from the frame buffer 341, to the SERDES 344 without change, in the normal mode. On the other hand, in the parallel mode, the DEMUX 342 divides the frame, output from the frame buffer 341, to generate two division frames, and outputs one division frame and the other division frame to the SERDES 344 and the SERDES 352 in the transmission/reception unit 312B, respectively.

The DEMUX 343 transfers a frame, output from the frame buffer 344, to the SERDES 341 without change, in the normal mode. On the other hand, in the parallel mode, the DEMUX 343 individually receives division frames from the SERDES 344 and the SERDES 352 in the transmission/reception unit 312B, integrates the received individual division frames to restore the original frame, and outputs the original frame to the frame buffer 341.

The SERDES 344 converts the frame, input as the parallel data, into serial data and outputs the serial data to the PHY 345. In addition, the SERDES 344 converts the frame, received as serial data from another switch through the PHY 345, into parallel data, and outputs the parallel data to the MUX 343.

The PHY 345 includes Tx, and transmits, as a differential signal, a frame serialized by the SERDES 344 to another switch. In addition, the PHY 345 includes Rx, receives, as a differential signal, a frame from another switch, and transmits the frame to the SERDES 344.

Figure 8:
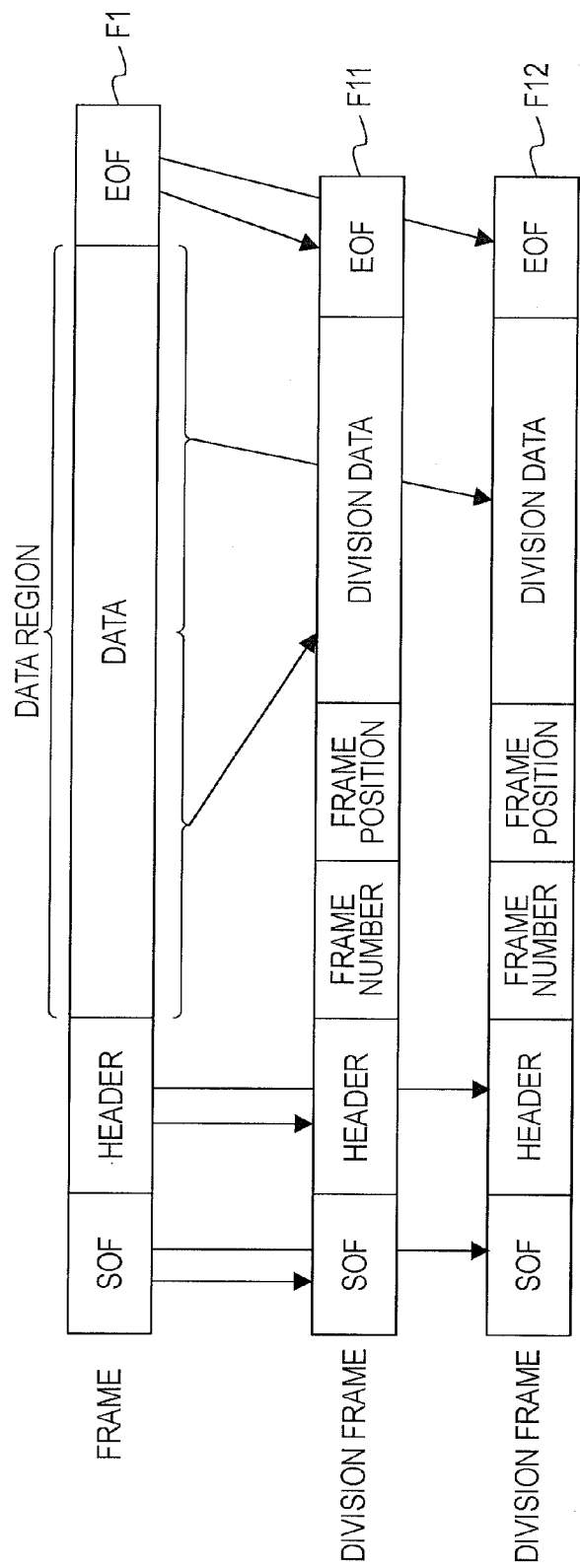
FIG. 8 is a diagram illustrating an example of a configuration of a division frame.

Next, the operations of the DEMUX 342 and the MUX 343 in the parallel mode is described. First, FIG. 8 is a diagram illustrating an example of the configuration of a division frame.

A usual frame F1 includes a Start Of Frame (SOF) indicating the leading end of the frame F1 and an End Of Frame (EOF) indicating the trailing end of the frame F1. In addition, for example, the frame F1 includes a header and a data region between the SOF and the EOF.

The DEMUX 342 generates two division frames F11 and F12 on the basis of the frame F1. In each of the division frames F11 and F12, division data obtained by dividing data stored in the data region of the frame F1 into two pieces of data. In addition, it is assumed that the division frame F11 is output from the DEMUX 342 to the SERDES 344 and the division frame F12 is output from the DEMUX 342 to the SERDES 352 in the transmission/reception unit 312b.

An SOF is disposed in the leading end of each of the division frames F11 and F12, and an EOF is disposed in the trailing end thereof. In addition, in each of the division frames F11 and F12, a header is disposed next to the SOF. The SOF, the header, and the EOF in each of the division frames F11 and F12 may be the same as the SOF, the header, and the EOF in the original frame F1, respectively.

In addition, in each of the division frames F11 and F12, a frame number, a frame position, and division data are disposed subsequent to the header. The frame number indicates that the original frame F1 before division is the same. Namely, in each of the division frames F11 and F12 generated from the same frame F1, the frame number of the same value is stored.

The frame position indicates which position in the original data the division data has been located at. In each of the division frames F11 and F12 generated from the same frame F1, the frame position of a different value is stored, and in the division frame in which the division data disposed in an anterior direction from among the original data is stored, the value of the frame position thereof is set to a small value. In the example in FIG. 8, the value of the frame position within the division frame F12 is set to a value larger than the value of the frame position within the division frame F11.

Figure 9:
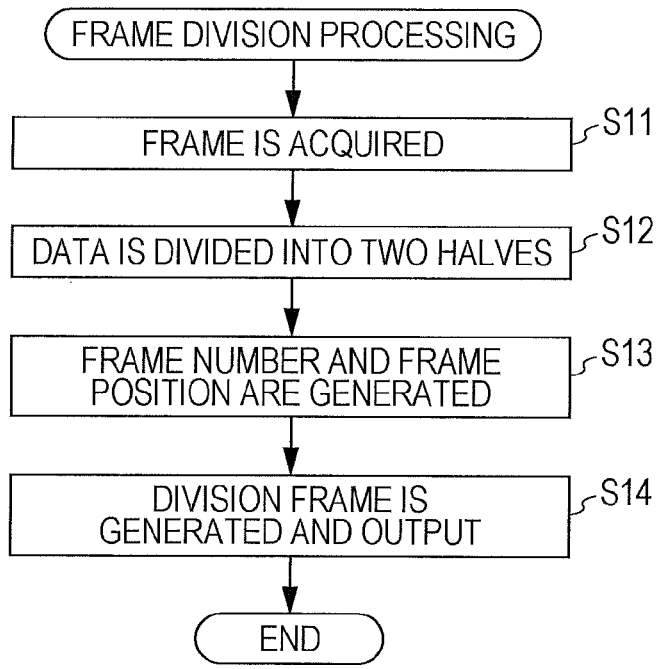
FIG. 9 is a flowchart illustrating an example of frame division processing due to DEMUX.

FIG. 9 is a flowchart illustrating an example of frame division processing due to DEMUX. In addition, in FIG. 9, as an example, the processing performed in the DEMUX 342 included in the transmission/reception unit 311B is described.

In step S11, the DEMUX 342 acquires a frame from the frame buffer 341. The DEMUX 342 stores the acquired frame in a reception buffer (not illustrated) included in the DEMUX 342, for example.

In step S12, the DEMUX 342 divides the data region of the acquired frame into two halves, and generates two pieces of division data. For example, the two generated pieces of division data are individually temporarily stored in two transmission buffers (not illustrated) included in the DEMUX 342.

In step S13, the DEMUX 342 generates a frame number and a frame position.

For example, the DEMUX 342 generates, as the frame number, a unique number by counting up a number every time frame division processing is executed with respect to each frame. The DEMUX 342 stores the generated frame numbers in both the two transmission buffers included in the DEMUX 342.

In addition, the DEMUX 342 generates a fixed value as a frame position relating to each of two division frames to be generated, for example. For example, as described above, compared with the value of the frame position stored in the division frame F11 to be transmitted from the transmission/reception unit 311B in which the DEMUX 342 is provided, the DEMUX 342 increases the value of the frame position stored in the division frame F12 to be transmitted from the other transmission/reception unit 312B capable of configuring a wide port. The DEMUX 342 individually stores the two generated frame positions in the two transmission buffers included in the DEMUX 342.

In step S14, in both the two transmission buffers included in the DEMUX 342, the DEMUX 342 stores the SOF, the header, and the EOF of the frame stored in the reception buffer in Step S11. Accordingly, the division frame is generated in each of the two transmission buffers. While outputting the division frame generated in one transmission buffer to the SERDES 344, the DEMUX 342 outputs the division frame generated in the other transmission buffer to the SERDES 352 in the transmission/reception unit 312B.

After the division frame output to the SERDES 344 in Step S14 has been converted into serial data by the SERDES 344, the division frame is transmitted by the PHY 345 to the transmission/reception unit 311A in an adjacent switch at 3 Gbps. In addition, after the division frame output to the SER-DES 352 in the transmission/reception unit 312B in Step S14 has been converted into serial data by the SERDES 352, the division frame is transmitted by the PHY 353 to the transmission/reception unit 312A in an adjacent switch at 3 Gbps.

Here, in the normal mode and the slow mode, the PHY 345 in the transmission/reception unit 311B and the PHY 353 in the transmission/reception unit 312B link up as a wide link (×2 wide link) utilizing two narrow ports. At this time, after the frame output from the frame buffer 341 to the DEMUX 342 has passed through the DEMUX 342 without change and been converted into serial data by the SERDES 344, the frame is transmitted from the PHY 345 to the transmission/reception unit 311A in an adjacent switch. The PHY 345 transmits the frame at 6 Gbps in the normal mode, and transmits the frame at 3 Gbps in the slow mode.

In addition, in the normal mode and the slow mode, after the frame output from the frame buffer 351 to the SERDES 352 has been converted into serial data by the SERDES 352, the frame is transmitted from the PHY 353 to the transmission/reception unit 312A in an adjacent switch. The PHY 353 transmits the frame at 6 Gbps in the normal mode, and transmits the frame at 3 Gbps in the slow mode.

On the other hand, in the parallel mode, each of the PHY 345 in the transmission/reception unit 311B and the PHY 353 in the transmission/reception unit 312B links up as a separate narrow link. At this time, the frame output from the frame buffer 341 to the DEMUX 342 is divided into two portions, and the two portions are individually transmitted from the PHY 345 in the transmission/reception unit 311B and the PHY 353 in the transmission/reception unit 312B at 3 Gbps. Accordingly, the influence of the insertion loss on a transmitted differential signal is reduced, and data turns out to be correctly transmitted.

In addition, each of a plurality of transmission/reception units configuring a wide port transmits and receives separate data. Therefore, in the normal mode, for example, when a bunch of data stored in an HDD within the DE is transferred, the data is transferred by one of the plural transmission/reception units configuring the wide port at up to 6 Gbps.

On the other hand, in the parallel mode, the sum of transfer speeds becomes a half of the transfer speed of the normal mode. However, when a bunch of data stored in an HDD within the DE is transferred, the data is divided and transferred from two transmission/reception units at half the speed. Therefore, the data is transferred at up to about 6 Gbps in the same way as in the normal mode. Namely, in the parallel mode, even if the transmission path between switches is so large that it is difficult to ignore the influence of the insertion loss, it is possible to correctly transmit data with a communication speed being hardly lowered, with respect to separate transmitted data.

Figure 10:
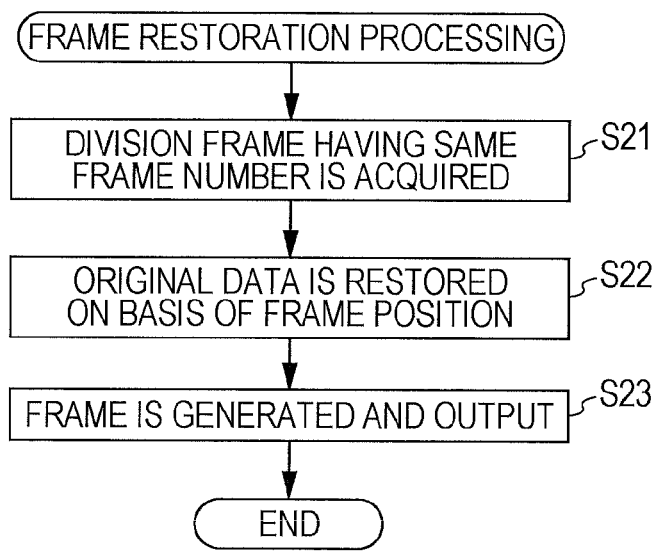
FIG. 10 is a flowchart illustrating an example of frame restoration processing due to MUX.

FIG. 10 is a flowchart illustrating an example of frame restoration processing due to MUX. In addition, in FIG. 10, as an example, the processing performed in the DEMUX 343 included in the transmission/reception unit 311B is described.

In step S21, the MUX 343 acquires division frames having the same value as a frame number from the SERDES 344 and the SERDES 352 in the transmission/reception unit 312B. For example, the MUX 343 stores two acquired division frames in two reception buffers (not illustrated) included in the MUX 343.

In step S22, the MUX 343 reads out frame positions from the two acquired division frames. The MUX 343 restores the original data in such a manner that, from among the two acquired division frames, division data within a division frame where the value of the frame position is smaller is the anterior half of data and division data within a division frame where the value of the frame position is larger is the posterior half of data. The MUX 343 stores the restored data in a transmission buffer (not illustrated) included in the MUX 343.

In step S23, the MUX 343 stores, in the transmission buffer included in the MUX 343, the SOF, the header, and the EOF of one division frame stored in the reception buffer in Step S21. Accordingly, the frame is restored in the transmission buffer, and the MUX 343 transmits the restored frame to the frame buffer 341.

According to the above-mentioned processing in FIG. 10, the division data is received, and it is possible to correctly restore the original data from the division data.

Figure 11:
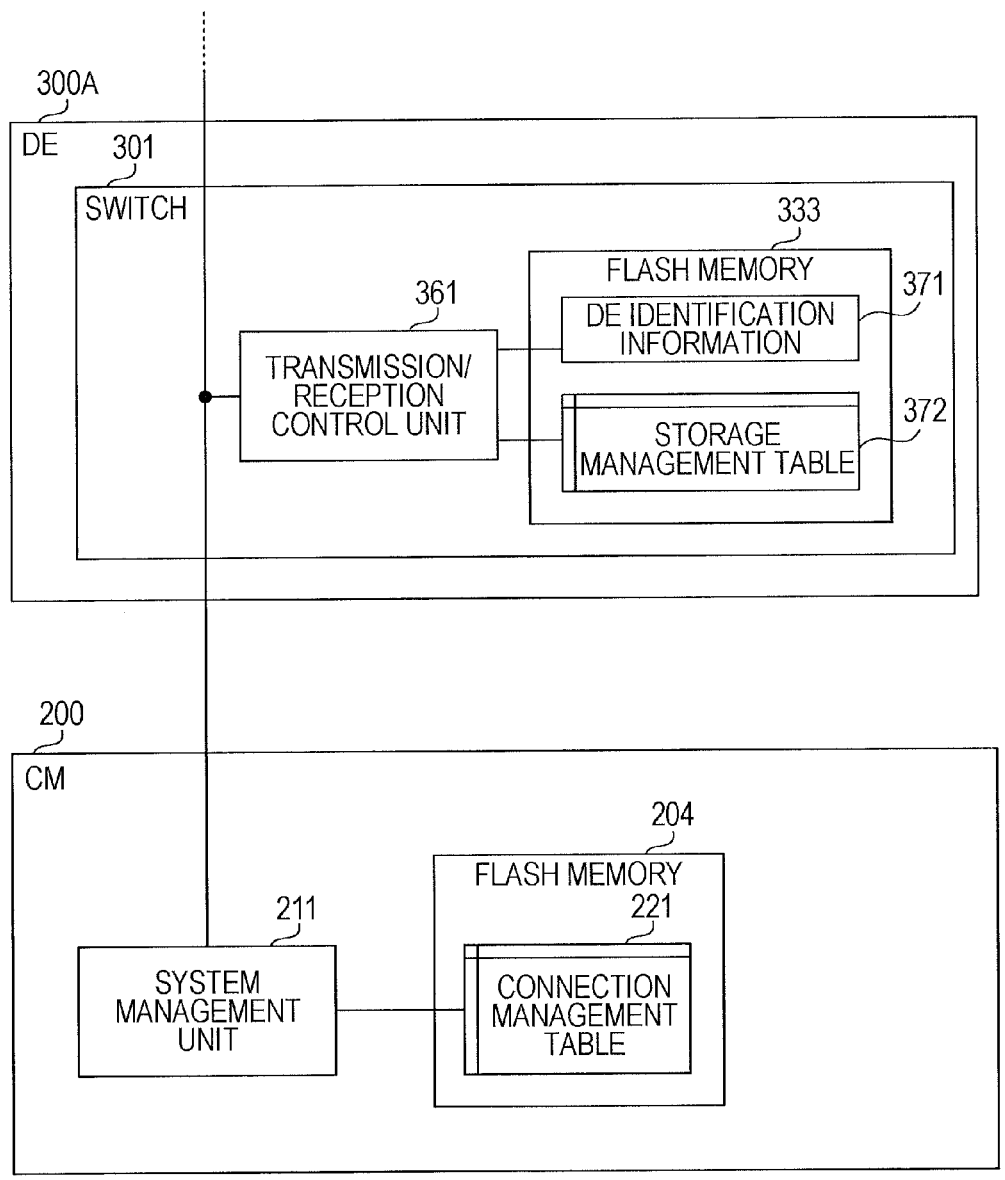
FIG. 11 is a block diagram illustrating an example of a processing function included in each of switches within CM and DE.

Next, selection control processing operations in the normal mode and the parallel mode is described. First, FIG. 11 is a block diagram illustrating an example of a processing function included in each of switches within CM and DE.

The CM 200 includes a system management unit 211. For example, the CPU within the ROC 202 executes predetermined firmware, thereby realizing processing performed in the system management unit 211. In addition, a connection management table 221 is stored in the flash memory 204 (or the RAM 203) in the CM 200.

On the other hand, the switch 301 included in each of the DEs 300A to 300G includes a transmission/reception control unit 361. For example, the CPU 331 included in the switch 301 executes predetermined firmware, thereby realizing processing performed in the transmission/reception control unit 361. In addition, DE identification information 371 and a storage management table 372 are stored in the flash memory 333 within the switch 301. In addition, since the switch 301 included in each of the DEs 300A to 300G has the same configuration, the DE 300A is illustrated in FIG. 11 on behalf of the DEs 300A to 300G.

The system management unit 211 in the CM 200 manages the whole storage system 100. For example, at the time of the power activation of the CM 200 or when a new DE is connected to the storage system 100, the system management unit 211 collects information relating to the DE form the DE and registers the information in the connection management table 221. Furthermore, the system management unit 211 transmits the content of the connection management table 221 to the switch 301 in each DE within the storage system 100. At this time, the transmitted information is used when each switch 301 sets an operation mode.

The transmission/reception control unit 361 in the switch 301 controls data relay processing performed within the switch 301. For example, in response to the destination of a frame output from the transmission/reception unit within the switch 301 to the crossbar 321, the transmission/reception control unit 361 controls the switching operation of the crossbar 321 so that the frame is input to a transmission/reception unit corresponding to the destination.

In addition, the transmission/reception control unit 361 sets an operation mode in each transmission/reception unit. For example, the setting of the operation mode is performed when the DE in which the switch 301 is provided is powered on or the CM 200 is powered on. When the operation mode is set, the transmission/reception control unit 361 transmits, to the system management unit 211 in the CM 200, the DE identification information 371 and information relating to a storage registered in the storage management table 372. After that, in response to the content of the connection management table 221 transmitted from the system management unit 211, the operation mode is selected.

The DE identification information 371 is information for identifying the DE in which the switch 301 is provided. In the storage management table 372, information is registered that relates to a storage device (an HDD, here) connected to the inside of the DE in which the switch 301 is provided. For example, as the information relating to the storage device, the identification information, the type information, the access speed information, and the like of the storage device are registered. For example, the information of the storage management table 372 is registered by the transmission/reception control unit 361 or in response to the input operation of a user. In the former case, the transmission/reception control unit 361 collects information relating to a storage device connected to the switch 301 from the storage device, and registers the information in the storage management table 372.

FIG. 12 is a diagram illustrating an example of the information registered in the connection management table.

In the connection management table 221, a record is provided with respect to each of a rack number for identifying a rack and a DE number for identifying a DE. The number of the rack numbers and the number of the DE numbers are determined in advance, and on the basis of the combination of the rack number and the DE number, it is possible to identify which position within the storage system 100 the DE is incorporated in. For example, the combination of the rack number "#1" and the DE number "#1" indicates the first slot (a slot in which the DE 300A in FIG. 3 is incorporated) from among DE-use slots within the first rack (the rack 110 in FIG. 3).

With respect to each DE number, the DE identification information for identifying the DE incorporated in the slot is registered. The system management unit 211 acquires the DE identification information 371 stored in the switch 301 in the corresponding DE through the transmission/reception control unit 361 in the switch 301, and hence the DE identification information to be registered in the connection management table 221 is obtained.

In addition, with respect to each DE number, an entry of each storage device included in the corresponding DE is provided, and information (storage information) relating to the storage device is registered in the entry. As the storage information, the identification information, the type information, the access speed information, and the like of the storage device are registered. The system management unit 211 acquires information registered in the storage management table 372 stored in the switch 301 in the corresponding DE through the transmission/reception control unit 361 in the switch 301, and hence the storage information to be registered in the connection management table 221 is obtained.

Figure 13:
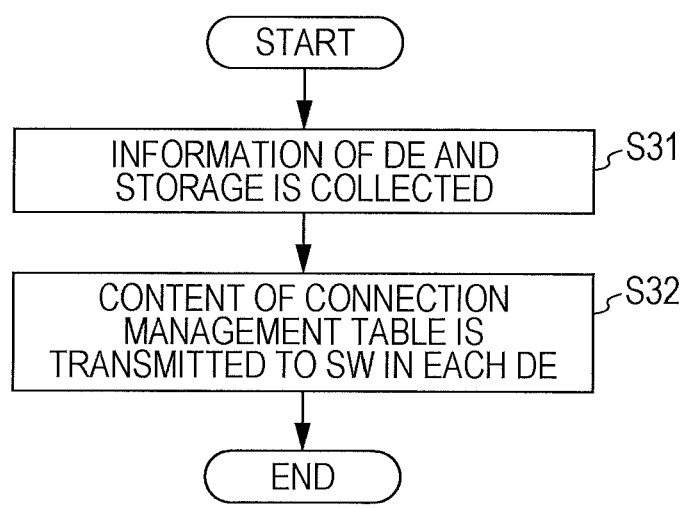
FIG. 13 is a flowchart illustrating an example of processing performed in a system management unit at the time of the activation of CM.

FIG. 13 is a flowchart illustrating an example of processing performed in the system management unit at the time of the activation of CM.

In step S31, when the CM 200 is powered on and the CM 200 is activated, the system management unit 211 communicates with the switch 301 in each DE within the storage system 100 through the switch 201. The system management unit 211 collects, from the switch 301 in each DE, information relating to each DE and the information of the storage device included in each DE, and registers the collected pieces of information in the connection management table 221.

In addition, for example, by performing information collection in the following way, the system management unit 211 determines which slot within the storage system 100 a DE to which the switch 301 of a communication partner belongs is incorporated in. In addition, here, the switch 201 in the CM 200 from among the cascade-connected switches is expressed as a highest-order switch.

First, the system management unit 211 requests an information notice from the switch 301 in the DE 300A connected under control of the switch 201 in the CM 200. The transmission/reception control unit 361 in the switch 301 in the DE 300A transmits the above-mentioned individual pieces of information to the system management unit 211 in the CM 200 in response to the information notice request. The system management unit 211 registers the received information in a record within the connection management table 221, which corresponds to the rack number "#1" and the DE number "#1".

Next, the system management unit 211 requests an information notice from the switch 301 in the DE 300B, connected lower than the switch 301 from which information transmission has been requested, and receives the above-mentioned individual pieces of information from the transmission/reception control unit 361 in the switch 301 in the DE 300B. The system management unit 211 registers the received information in a record within the connection management table 221, which corresponds to the rack number "#1" and the DE number "#2".

By further requesting, in the above-mentioned procedure, information transmission from the switch 301 ranked lower than the switch 301 from which information has been acquired, the system management unit 211 recognizes which slot in which rack the switch of the request destination of information transmission is incorporated in. In addition, the system management unit 211 registers the information acquired from the switch, in a record in the connection management table 221, which corresponds to the recognized slot.

In step S32, the system management unit 211 transmits the content of the connection management table 221 to each switch 301 that is the source of information collection in Step S31. In this processing, for example, the system management unit 211 transmits, to all the switches 301, the combination of the rack number and the DE number, the DE identification information associated with each combination, and the access speed information in every piece of storage information associated with each combination.

In addition, for example, when a new DE has been connected to the storage system 100 after the activation of the CM 200, the system management unit 211 collects information relating to the DE and the information of a storage device within the DE from a switch in the newly connected DE, in the same procedure as in the above-mentioned Step S31, and registers the pieces of information in the connection management table 221. In addition, in the same procedure as in the above-mentioned Step S32, the system management unit 211 transmits the information registered in the connection management table 221 to the switch 301 in the newly connected DE.

Figure 14:
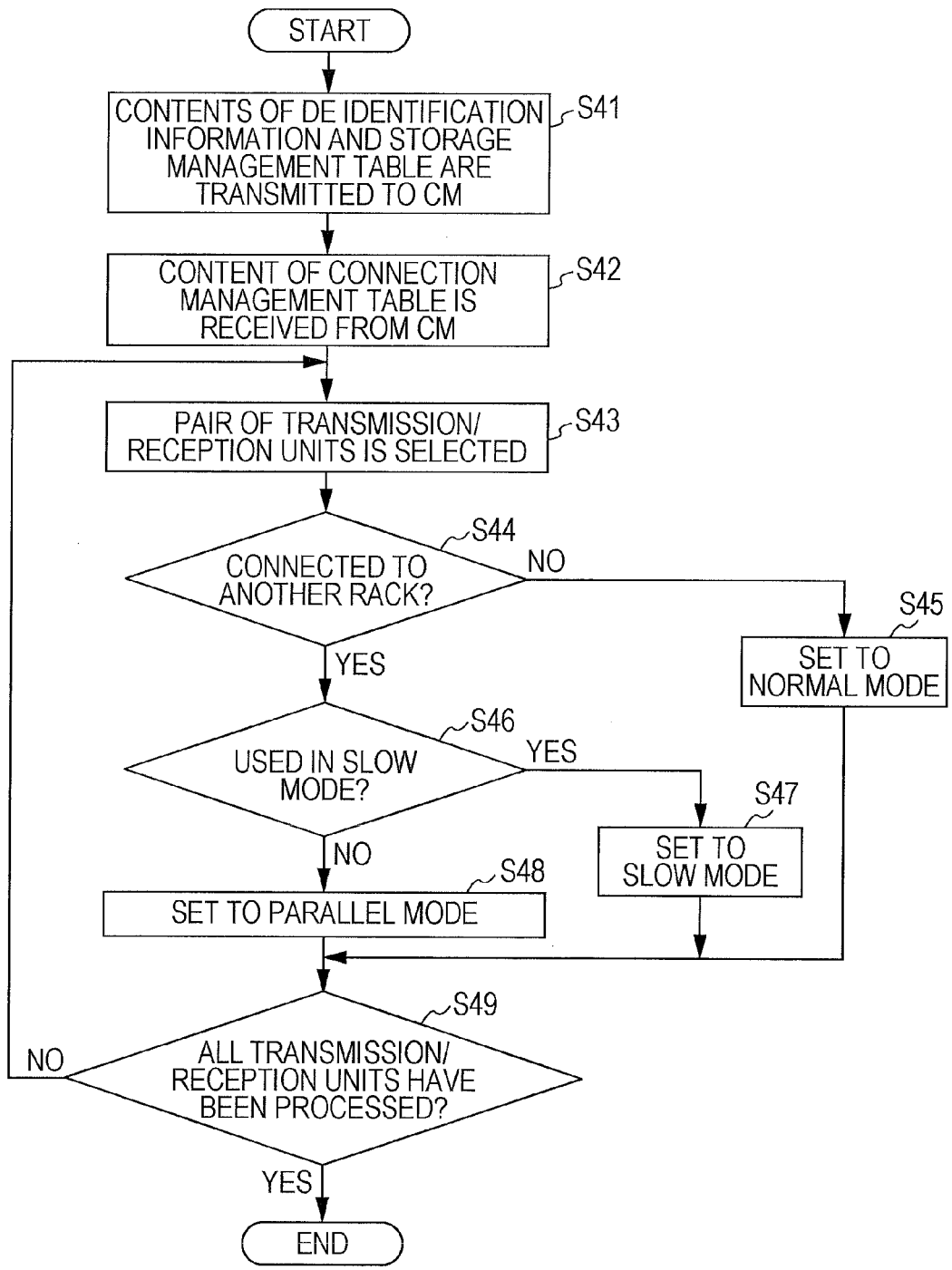
FIG. 14 is a flowchart illustrating an example of operation mode setting processing due to a switch in DE.

FIG. 14 is a flowchart illustrating an example of operation mode setting processing due to a switch in the DE. In addition, since each of the switches 301 in the DEs 300A to 300G performs the same processing, the processing performed in the switch 301 in the DE 300A is described as an example, here.

In step S41, when the DE 300A has been activated or when the CM 200 has been activated in a state in which the DE 300A is activated, the transmission/reception control unit 361 in the DE 300A transmits, to the system management unit 211 in the CM 200, information relating to the DE 300A and information relating to a storage device included in the DE 300A. Specifically, the transmission/reception control unit 361 transmits the DE identification information 371 stored in the flash memory 333 to the system management unit 211 in the CM 200. In addition, the transmission/reception control unit 361 transmits, to the system management unit 211 in the CM 200, the identification information, the type information, the access speed information, and the like of the storage device, registered in the storage management table 372 within the flash memory 333.

In the procedure illustrated in Step S31 in FIG. 13, the information transmitted from the transmission/reception control unit 361 is received by the system management unit 211 in the CM 200, and registered in the connection management table 221.

In step S42, the transmission/reception control unit 361 receives the information transmitted from the system management unit 211 in the CM 200 in the procedure in Step S32 in FIG. 13. The information received at this time includes the combination of the rack number and the DE number, the DE identification information associated with each combination, and the access speed information in every piece of storage information associated with each combination.

In step S43, the transmission/reception control unit 361 selects a pair of transmission/reception units configuring a wide port, as a processing target, from among the transmission/reception units included in the switch 301. For example, a pair of transmission/reception units selected in this processing indicates a pair of transmission/reception units 311A and 312A or a pair of transmission/reception units 311B and 312B in FIG. 7.

In step S44, on the basis of the information received in Step S42, the transmission/reception control unit 361 determines whether the transmission/reception units selected in Step S43 are connected to a DE within another rack different from the rack mounted with the DE 300A. In this determination processing, the transmission/reception control unit 361 extracts the combination of the rack number and the DE number, associated with the DE identification information 371 indicating the DE 300A, from the information received in Step S42. From the extracted combination of the rack number and the DE number, the transmission/reception control unit 361 discerns the position of a slot in which the DE 300A is incorporated.

In a case in which the transmission/reception units selected in Step S43 are connected to a switch on a low-order side (namely, a switch on the side opposite to the CM 200), when the DE number associated with the DE 300A has the largest value within the same rack, the transmission/reception control unit 361 determines that the selected transmission/reception units are connected to a DE within another rack. In addition, in a case in which the transmission/reception units selected in Step S43 are connected to a switch on a high-order side, when the rack number associated with the DE 300A is other than "#1" and the DE number associated with the DE 300A is "#1", the transmission/reception control unit 361 determines that the selected transmission/reception units are connected to a DE within another rack.

When having determined that the transmission/reception units are connected to a DE within another rack (S44: Yes), the transmission/reception control unit 361 executes processing in Step S46. On the other hand, when having determined that the transmission/reception units are connected to a DE within the same rack (S44: No), the transmission/reception control unit 361 executes processing in Step S45.

In step S45, when it has been determined that the transmission/reception units selected in Step S43 are connected to a DE within the same rack (S44: No), the length of a transmission path is not particularly long, and it may be considered that no influence of the insertion loss occurs. In this case, the transmission/reception control unit 361 sets the operation mode of the selected transmission/reception units to the normal mode. After that, processing in Step S49 is executed.

In step S46, when it has been determined that the transmission/reception units selected in Step S43 are connected to a DE within another rack (S44: Yes), it may be considered that the length of a transmission path is so long that it is difficult to ignore the influence of the insertion loss. In this case, the transmission/reception control unit 361 selects an operation mode in which the transmission speed of each narrow port is set to ½ (namely, 3 Gbps).

First, on the basis of the information received in Step S42, the transmission/reception control unit 361 determines whether a transmission speed between switches is to be set to a slow speed and to be used. In this case, the "slow speed" means that a bunch of data from the CM 200, which is an access target, is transmitted between switches at a speed less than or equal to 3 Gbps.

For example, in a case in which the transmission/reception units selected in Step S43 are connected to a switch on a low-order side, when the effective data rates of all storage devices mounted on DEs located on the low-order side of the DE 300A are less than or equal to 300 Mbytes/s, the transmission/reception control unit 361 determines that a transmission speed between switches located on the low-order side is to be set to a slow speed and to be used. In addition, in a case in which the transmission/reception units selected in Step S43 are connected to a switch on a high-order side, when the effective data rates of all storage devices mounted on the DE 300A and DEs located on the low-order side of the DE 300A are less than or equal to 300 Mbytes/s, the transmission/reception control unit 361 determines that both the transmission speed of the switch in the DE 300A and a transmission speed between switches located on the low-order side of the DE 300A are to be set to slow speeds to and be used.

When having determined that the transmission speed is to be set to a slow speed and to be used (S46: Yes), the transmission/reception control unit 361 executes processing in Step S47. On the other hand, when having determined that the transmission speed is not to be set to a slow speed and to be used (S46: No), the transmission/reception control unit 361 executes processing in Step S48.

In step S47, when, in step S46, it has been determined that the transmission speed is to be set to a slow speed and to be used (S46: Yes), it may be considered that it is not necessary to transmit a bunch of data from the CM 200, which is an access target, at 6 Gbps using the pair of transmission/reception units selected in Step S43. This is because the effective data rates of all storage devices accessed through the selected transmission/reception units are less than or equal to 300 MBytes/s and it is possible to transmit data read out from these storage devices, between switches at a transmission speed of 3 Gbps. In this case, the transmission/reception control unit 361 sets the operation mode of the transmission/reception units selected in Step S46 to the slow mode. After that, processing in Step S49 is executed.

In step S48, the transmission/reception control unit 361 sets the operation mode of the transmission/reception units selected in Step S46, to the parallel mode. As described above, in the parallel mode, using the selected pair of transmission/reception units, parallel communication of 6 Gbps as a whole is performed. Therefore, it is possible to transmit a bunch of data from the CM 200, which is an access target, at 6 Gbps. After that, processing in Step S49 is executed.

In step S49, the transmission/reception control unit 361 determines whether all pairs of transmission/reception units configuring wide ports, included in the switch 301, have been selected. When there is a pair of transmission/reception units that have not been selected (S49: No), the transmission/reception control unit 361 proceeds to Step S43, and selects the pair of transmission/reception units that have not been selected. On the other hand, all pairs of transmission/reception units have been selected (S49: Yes), the transmission/reception control unit 361 terminates the operation mode setting processing.

According to the above-mentioned processing in FIG. 14, when a pair of transmission/reception units configuring a wide port is connected to a DE in another rack, it is determined that a transmission path is long and the pair of transmission/reception units is set to the parallel mode. Accordingly, it is possible to correctly transmit data without a communication speed per one piece of data being lowered.

In this regard, however, even if it is determined that a transmission path is long, since a maximum transmission speed per one piece of data between switches becomes larger than the access speed of a storage device whose access path corresponds to a pair of transmission/reception units, the pair of transmission/reception units is set to the slow mode when it is determined that it is not necessary to set the parallel mode. Accordingly, communication in the wide port is maintained, and it is possible to transmit separate data in each of the transmission/reception units configuring the wide port. Namely, compared with a case in which the parallel mode is set, it is possible to transmit a large number of pieces of data.

In addition, while, in the second embodiment described above, communication based on the parallel mode is realized by combining two transmission/reception units, the communication based on the parallel mode may also be realized by combining more than two transmission/reception units. For example, when n transmission/reception units are combined, a transmission speed due to each transmission/reception unit is set to 1/n of the normal mode. In addition, one of the n transmission/reception units generates n division frames on the basis of a transmission frame, and causes the n division frames to be transmitted in parallel from the n transmission/reception units. In addition, the division frames received by n transmission/reception units are restored to one frame by one of the n transmission/reception units.

In addition, while, in the above-mentioned second embodiment, each switch 301 performs the selection of an operation mode, the CM 200 may also perform the selection of an operation mode, as another example. In this case, for example, after having collected the information of DEs and storage devices in such a way as in Step S31 in FIG. 13, the system management unit 211 in the CM 200 selects an operation mode to be set with respect to each pair of transmission/reception units within each switch 301, on the basis of the collected information, in such a procedure as in Steps S43 to S49 in FIG. 14. In addition, the system management unit 211 transmits the selected operation mode to each switch 301, and causes the operation mode to be set in a corresponding transmission/reception unit.

Furthermore, while, in the above-mentioned second embodiment, the selection of an operation mode is performed on the basis of the information managed by the CM 200, the selection of an operation mode may also be performed on the basis of the cable length information within a memory mounted in the connector of a communication cable, as another example. In this case, in a cable connection unit in the switch 301, a read circuit is provided that is used for reading data from the memory mounted in the connector of the communication cable. On the basis of the cable length information read by the read circuit, the transmission/reception control unit 361 in the switch 301 compares the length of the communication cable connected to the transmission/reception unit with a predetermined reference value, thereby performing the determination in Step S44 in FIG. 14. In addition, when the length of the communication cable is less than or equal to the reference value, the transmission/reception control unit 361 executes processing in Step S45. On the other hand, when the length of the communication cable exceeds the reference value, the transmission/reception control unit 361 executes processing in Step S46.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing system comprising:
   information processing devices; and
   relay devices configured to relay data transmitted and received between the information processing devices, a relay device including:
   communication ports configured to transmit data between the relay devices, and
   processing hardware:
      configured to cause a first transmission/reception operation and a second transmission/reception operation to be selectively executed, the first transmission/reception operation being an operation in which data is caused to be transmitted and received at a first transmission speed in the communication ports, the second transmission/reception operation being an operation in which data divided into a plurality of data equal to a number of communication ports is caused to be transmitted and received in parallel in the number of communication ports at a second transmission speed lower than the first transmission speed, and
      configured to generate divided transmission data, which number of divided transmission data is equal to the number of communication ports, to cause the generated pieces of divided transmission data to be transmitted in parallel through the respective communication ports, when the second transmission/reception operation is selected.

2. The information processing system according to claim 1, wherein,
   a relay device further includes processing hardware to integrate divided reception data received through the number of communication ports to restore original data, when the second transmission/reception operation is selected.

3. The information processing system according to claim 1, wherein,
   one of the first transmission/reception operation and the second transmission/reception operation is selected in response to a distance of a transmission path between the relay devices.

4. The information processing system according to claim 3, wherein,
   one of the information processing devices is a control device controlling the other information processing devices, the control device includes a memory that stores position information indicating a position of a relay device in the information processing system, wherein the processing hardware of the relay device receives the position information stored in the memory of the control device and selects one of the first transmission/reception operation and the second transmission/reception operation on basis of the received position information.

5. The information processing system according to claim 3, wherein,
   the first transmission/reception operation is selected when the distance of the transmission path between the relay devices is less than or equal to a reference value, and the second transmission/reception operation is selected when the distance of the transmission path between the relay devices is larger than the reference value.

6. The information processing system according to claim 1, wherein,
   one of the information processing devices is a storage device, and
   the processing hardware of the relay device causes a third transmission/reception operation to be executed in which serial communication is caused to be performed at the second transmission speed in the communication ports, when access speed of the storage device which access path corresponds to the number of communication ports is smaller than a speed obtained by multiplying the second transmission speed by the number of communication ports.

7. The information processing system according to claim 1, wherein,
   the processing hardware of the relay device selects the second transmission/reception operation, when the relay device is housed in a housing different from a housing in which another one of the relay devices is housed.

8. The information processing system according to claim 1, wherein the communication ports in cascading relay devices perform serial communication.

9. A relay device relaying data between information processing devices, the relay device comprising:
   communication ports configured to communicate with another relay device; processing hardware:
      configured to cause a first transmission/reception operation and a second transmission/reception operation to be selectively executed, the first transmission/reception operation being an operation in which data is caused to be transmitted and received at a first transmission speed in the communication ports, the second transmission/reception operation being an operation in which data divided into a plurality of data equal to a number of communication ports is caused to be transmitted and received in parallel in the number of communication ports at a second transmission speed, lower than the first transmission speed; and
      configured to generate divided transmission data, which number of divided transmission data is equal to the number of communication ports, to cause the generated divided transmission data to be transmitted in parallel through the respective communication ports, when the second transmission/reception operation is selected.

10. The relay device according to claim 9, further comprising:
    processing hardware that integrates divided reception data received through the number of communication ports to restore original data, when the second transmission/reception operation is selected.

11. The relay device according to claim 9, wherein
one of the first transmission/reception operation and the second transmission/reception operation is selected in response to a distance of a transmission path between the communication ports of the relay device and communication ports of another relay device.

12. The relay device according to claim 11, wherein,
the first transmission/reception operation is selected when the distance of the transmission path between the communication ports of the relay device and the communication ports of the other relay device is less than or equal to a reference value, and the second transmission/reception operation is selected when the distance of the transmission path between the communication ports of the other relay device is larger than the reference value.

13. A communication control method for a relay device in an information processing system including information processing devices, the relay device configured to relay data transmitted and received between the information processing devices, the method comprising:
  selecting one of a first transmission/reception operation and a second transmission/reception operation in response to a distance of a transmission path between communication ports of the relay device and communication ports of another relay device, the first transmission/reception operation being a transmission/reception operation in which data is caused to be transmitted and received at a first transmission speed in the communication ports of the relay device, the second transmission/reception operation being a transmission/reception operation in which data divided into a plurality of data equal to a number of communication ports is caused to be transmitted and received in parallel in the number of communication ports at a second transmission speed, lower than the first transmission speed;
  executing the selected one of the first transmission/reception operation and the second transmission/reception operation;
  generating divided transmission data, which number of divided transmission data is equal to the number of communication ports of the relay device, when the second transmission/reception operation is selected; and
  causing the generated divided transmission data to be transmitted in parallel through the respective communication ports of the relay device.

14. The communication control method according to claim 13, further including:
  integrating dividing reception data received through the number of communication ports; and
  restoring original data, when the execution of the second transmission/reception operation is selected.

15. The communication control method according to claim 13, wherein further comprising:
  receiving a position information from one of the information processing devices, wherein the selecting selects one of the first transmission/reception operation and the second transmission/reception operation on basis of the received position information.

16. The communication control method according to claim 13, further comprising:
  causing a third transmission/reception operation to be executed in which serial communication is caused to be performed at the second transmission speed in the communication ports, when one of the information processing devices is a storage device and access speed of the storage device which access path corresponds to the number of communication ports is smaller than a speed obtained by multiplying the second transmission speed by the number of communication ports.

17. The communication control method according to claim 13, wherein the selecting selects the second transmission/reception operation, when the relay device is housed in a housing unit different from a housing unit in which another relay device is housed.

* * * * *

UNITED STATES PATENT AND TRADEMARK OFFICE
CERTIFICATE OF CORRECTION

PATENT NO. : 8,804,706 B2
APPLICATION NO. : 13/308980
DATED : August 12, 2014
INVENTOR(S) : Keisuke Yamasaki Page 1 of 1

It is certified that error appears in the above-identified patent and that said Letters Patent is hereby corrected as shown below:

On the Title Page

Column 2, Item [56] (Foreign Patent Documents), Line 3, after "JP 2004-304255 10/2004" insert -- JP 2005-57482 03/2005 --, therefor.

In the Claims

Column 19, Lines 44-45, In Claim 1, after "generated" delete "pieces of".

Signed and Sealed this
Eleventh Day of November, 2014

Michelle K. Lee
*Deputy Director of the United States Patent and Trademark Office*